United States Patent

Bigelow et al.

Patent Number: 5,582,949
Date of Patent: Dec. 10, 1996

[54] PROCESS FOR IMPROVING BELTS

[75] Inventors: Richard W. Bigelow, Webster; Jeffrey W. Drawe, Rochester; Richard L. Schank, Pittsford, all of N.Y.

[73] Assignee: Xerox Corporation, Stamford, Conn.

[21] Appl. No.: 634,376

[22] Filed: Dec. 27, 1990

[51] Int. Cl.$^6$ .................................................. G03G 5/00
[52] U.S. Cl. .................... 430/132; 427/74; 428/57; 428/61; 430/56; 430/59; 430/69
[58] Field of Search ........................ 430/132, 56, 59, 430/69; 428/61, 57; 427/74

[56] References Cited

U.S. PATENT DOCUMENTS

| | | | |
|---|---|---|---|
| 3,121,006 | 2/1964 | Middleton et al. | 96/1 |
| 3,357,989 | 12/1967 | Byrne et al. | 260/314.5 |
| 3,442,781 | 5/1969 | Weinberger | 204/181 |
| 3,546,054 | 12/1970 | Ross | 161/38 |
| 3,928,036 | 12/1975 | Jones | 96/1.5 |
| 4,092,173 | 5/1978 | Novak et al. | 96/119 R |
| 4,187,407 | 2/1980 | Marko, Jr. | 219/91.2 |
| 4,233,384 | 11/1980 | Turner et al. | 430/59 |
| 4,265,990 | 5/1981 | Stolka et al. | 430/59 |
| 4,286,033 | 8/1981 | Neyhart et al. | 430/58 |
| 4,291,110 | 9/1981 | Lee | 430/59 |
| 4,299,897 | 11/1981 | Stolka et al. | 430/59 |
| 4,306,008 | 12/1981 | Pai et al. | 430/59 |
| 4,333,998 | 6/1982 | Leszyk | 430/12 |
| 4,338,387 | 7/1982 | Hewitt | 430/58 |
| 4,362,799 | 12/1982 | Kondo et al. | 430/67 |
| 4,363,858 | 12/1982 | Vercoulen | 430/56 |
| 4,415,639 | 11/1983 | Horgan | 430/57 |
| 4,418,134 | 11/1983 | Patel et al. | 430/88 |
| 4,426,431 | 1/1984 | Harasta et al. | 430/14 |
| 4,439,507 | 3/1984 | Pan et al. | 430/59 |
| 4,472,491 | 9/1984 | Wiedemann | 430/58 |
| 4,477,548 | 10/1984 | Harasta et al. | 430/14 |
| 4,515,882 | 5/1985 | Mammino et al. | 430/58 |
| 4,532,166 | 7/1985 | Thomsen et al. | 428/57 |
| 4,626,391 | 10/1986 | Taylor | 264/46.6 |
| 4,758,486 | 7/1988 | Yamazaki et al. | 430/56 |
| 4,838,964 | 6/1989 | Thomsen et al. | 156/73.1 |
| 4,937,117 | 6/1990 | Yu | 428/57 |
| 4,959,109 | 9/1990 | Swain et al. | 156/73.4 |
| 4,978,708 | 12/1990 | Fowler et al. | 524/507 |

*Primary Examiner*—Marion E. McCamish

[57] ABSTRACT

A process for coating flexible belt seams including providing a flexible belt having an outwardly facing surface and a welded seam, forming a smooth liquid coating on the welded seam, the liquid coating comprising a film forming polymer and a fugitive liquid carrier in which the belt surface is substantially insoluble, and removing the fugitive liquid carrier to form a smooth solid coating on the seam.

4 Claims, 2 Drawing Sheets

PROCESS FOR IMPROVING BELTS

BACKGROUND OF THE INVENTION

This invention relates in general to a process for coating seamed belts and more specifically to a process for coating belt seams with coatings containing film forming polymers.

Various techniques have been devised for joining belts such as photoreceptor belts. Belts may be joined in manufacture by overlapping the edge of one end of a sheet over the other opposite edge of the sheet thus forming a lap joint or seamed region that is thereafter welded. The technique of joining thermoplastic belted materials is well known and illustrated, for example, in U.S. Pat. No. 4,838,964 and U.S. Pat. No. 4,959,109, both of these patents being incorporated by reference herein in their entirety.

Acceptable joints formed in the aforementioned joining process for belt shaped electrophotographic imaging members perform satisfactorily when transported around relatively large diameter rollers. The lap joints or seams of these belts contain a deposit of web material melted during joining. These deposits or "weld splashes" are formed on each side of the welded web adjacent to and adhering to each end of the original web and to the regions of the web underlying each splash. Unfortunately, when the belts are transported around very small diameter rollers having, for example a diameter of about 19 mm or less, the weld splash on the outer surface of the belt gradually separates from the upper end of the photoreceptor web during cycling to form an open crevasse or crack. If the photoreceptor is cycled such that the cleaning blade is incident from the direction of the lower overlapped level, an abrupt or impulsive force can be delivered by the blade to the seam edge which can separate or cause further separation of the photoreceptor web and splash. Carrier beads and toner particles or liquid ink developer collect in the space between the web and splash and are periodically ejected when the splash flops open when, for example, passing around small diameter rollers. The ejected materials float to various subassemblies (e.g. corotrons, lamps) and causes them to fail or perform poorly and ultimately cause copy defects. Collisions of the blade with the irregular seam surface or with the flopping splash can also result in the blade becoming chipped and pitted. These chips and pits in the blade leave streaks of toner or liquid ink on the photoreceptor surface which eventually appear as streaks on copies made during subsequent electrophotographic imaging cycles and adversely affect image quality.

Thus, problems encountered with belt-type photoreceptors having a seam include repeated striking of the seam by cleaning blades. This causes toner developer or liquid ink agglomerates to form that are trapped at the irregular surface of the seam. Belted photoreceptors can also tend to delaminate at the seam when the seam is subjected to constant battering by the cleaning blade. Plus, collisions between the cleaning blade and an irregular seam surface can damage the blade thereby shortening blade and photoreceptor life and degrading copy quality.

If a photoreceptor seam is coated with a solution of a resinous coating material dissolved in a solvent which also dissolves or otherwise adversely interacts with the outer photoreceptor material, and heated or placed in a vacuum to accelerate the removal of the solvent, the incipient photoreceptor seam coating can undergo substantial redistribution and deformation resulting, for example, in non-uniform defects such as creasing, wrinkling, cracking, blisters and the like due to solvent attack of components in the photoreceptor. Moreover, during the use of such solution based coating techniques, the solvent can attack one or more layers of the photoreceptor belt and cause significant damage or complete destruction of the functional properties of the photoreceptor belt such as the flexibility, structural strength, or the imaging characteristics of the belt.

INFORMATION DISCLOSURE STATEMENT

In U.S. Pat. No. 4,472,491 to Wiedemann, issued Sep. 18, 1984—An ultraviolet radiation-cured protective layer comprising an acrylated binder is disclosed. The protective layer materials include an acrylated polyurethane, an acrylated polyester and an acrylated epoxide resin. Suitable curing is provided by radiation sources with electrical outputs of 100 W/cm (e.g. see column 4, lines 38–42).

In U.S. Pat. No. 4,092,173 to Novak et al, issued May 30, 1978, and U.S. Pat. No. 4,333,998 to Leszyk, issued Jun. 8, 1982—Radiation curable compositions comprising an acrylated urethane, an aliphatic ethylenically-unsaturated carboxylic acid and a multifunctional acrylate are disclosed. The composition in U.S. Pat. No. 4,333,998 additionally includes a siloxy-containing polycarbinol.

In U.S. Pat. No. 4,362,799 to Kondo et al, issued Dec. 7, 1982—An image holding member comprising a thermal or radiation curable epoxyacrylate resin insulating layer is disclosed. An object of the invention is to provide a surface that has good cleaning properties (e.g. see column 2, lines 57–62).

In U.S. Pat. No. 4,426,431 issued Jan. 17, 1984 and U.S. Pat. No. 4,477,548 issued Oct. 16, 1984 to Harasta et al—Radiation curable protective compositions are disclosed. In U.S. Pat. No. 4,426,431, the coating comprises polymerizable epoxy, acrylic and silane compounds. In U.S. Pat. No. 4,477,548, the coating composition includes a multifunctional acrylate of formula (III) (e.g. see column 12, lines 55–59).

While some of the above described members exhibit certain desirable properties such as providing restorative and/or protective treatment of surfaces, there continues to be a need for improved seamed belts, particularly in electrostatographic imaging systems utilizing blade cleaning. When ultrasonic welding techniques are utilized to fabricate belts having welded seams, particularly photoreceptors in electrostatographic copiers, duplicators, printers and the like that are transported over small diameter rollers, copy quality can deteriorate when blade cleaning is used during image cycling. Thus, there remains a need to provide electrophotographic imaging members having seam enhanced durability which allows for extended photoreceptor life. Also, a need exists for photoreceptor imaging members having improved copy quality and reliability. The application of a uniform coating over the entire surface of a photoreceptor web prior to cutting and welding does not improve the performance of a welded seam. The application of an overcoating over the entire outer surface of a flexible photoreceptor belt subsequent to cutting and welding is extremely difficult and time consuming because of the thickness tolerances required to ensure uniform electrical imaging properties.

SUMMARY OF THE INVENTION

It is an object of this invention to provide a seam coating process which overcomes the above-noted disadvantages.

It is another object of this invention to provide a seamed coating process which forms coated seams that avoid weld splash separation when cycled over small diameter rollers.

It is still another object of this invention to provide a seamed coating process for fabricating belted photoreceptors which minimizes the formation of streaks on copies.

It is another object of this invention to provide a seam coating process which increases belt seam life.

It is still another object of this invention to provide a seam coating process which extends the useful life of belted photoreceptors.

It is yet another object of this invention to provide a seam coating process which provides for a smooth transition for a cleaning blade to follow while it moves over a photoreceptor seam and thereby increasing the useful life of cleaning blade members.

It is another object of this invention to provide a seam coating process for seamed photoreceptors which fills voids and non-uniformities in the seam so as not to trap liquid ink or dry toner and carry it into the next machine cycle.

It is still another object of this invention to provide a seam coating process for seamed photoreceptors which is an economical and practical method for conditioning seamed photoreceptors.

The foregoing objects and others are accomplished in accordance with this invention by providing a process for coating flexible belt seams comprising providing a flexible belt having an outwardly facing surface and a welded seam, forming a smooth liquid coating on the welded seam, the liquid coating comprising a film forming polymer and a fugitive liquid carrier in which the belt surface is substantially insoluble, and removing the fugitive liquid carrier to form a smooth solid coating on the seam.

The advantages of the coated seam belts will become apparent upon consideration of the following disclosure of the invention, particularly when taken in conjunction with the accompanying drawings.

BRIEF DESCRIPTION OF THE DRAWINGS

A more complete understanding of the seam coating process and apparatus of the present invention can be obtained by reference to the accompanying drawings wherein.

These figures merely schematically illustrate the invention and are not intended to indicate relative size and dimensions of the belt, components thereof or means to fabricate the belt. For illustrative purposes, most of the following discussion is with specific reference to photoreceptors although the process of this invention is applicable to other types of seamed flexible belts.

Figure 1:
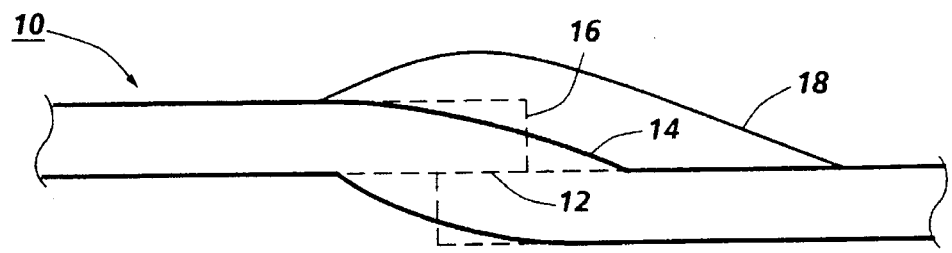
FIG. 1 is a schematic, sectional view in elevation of a coated and welded lap joint seamed belt.

Referring to FIG. 1, the overlapping ends of flexible photoreceptor 10 form the lap joint or seam 12 which when welded forms the seam weld 14. A seam coating 18 may be applied by any suitable technique over the seam weld 14. The coating 18 is initially applied as a thick layer at the point where the surface irregularity on the photoreceptor seam weld 14 is greatest, for example, near the centerline where the belt ends 16 overlap (represented by phantom lines), forming the uniformly smooth seam coating 18.

Figure 2:
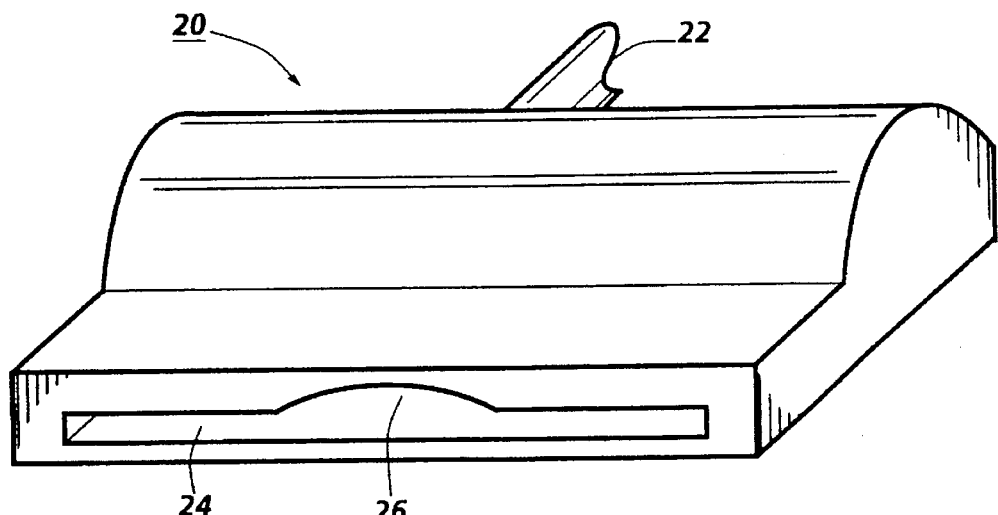
FIG. 2 is a schematic isometric view of an extrusion die means for coating belt seams.

Referring to FIG. 2, a thicker coating at the point of maximum seam weld irregularity may be achieved by an extrusion die 20 which has a feed inlet 22 for controlled delivery of the coating composition to the die 20 and extrusion slot discharge opening 24 which is relatively small at each end of the extrusion slot but is relatively large in the center 26. Alternatively, multiple extrusion die nozzles may be used to apply the coating with the flow of coating material being greater in the nozzles located immediately above the point where the surface irregularity on the photoreceptor seam weld 14 is greatest and diminishing at each direction away from the center of the seam weld 14. This allows a ribbon of the coating material having a thicker central region to fill in the large gap at the upper web end and feather by flow at each edge.

Figure 3:
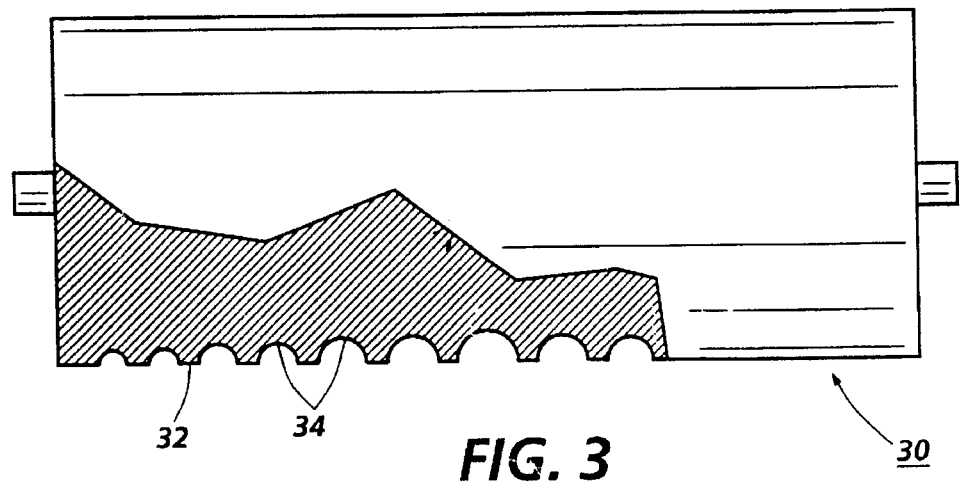
FIG. 3 is a schematic, partial sectional view in elevation of a serrated roller applicator means for coating belt seams.

Alternatively, as shown in FIG. 3, the coating material may be applied with a pitted or serrated roller-type applicator 30 where the lands 32 separate the cells 34. The cells 34 that carry the coating material are deeper at the region opposite the seam 14, e.g. the center of the roller applicator 30 and shallower towards the ends or edges of the serrated roller applicator. The cells 34 may be dimple-like depressions or circumferential grooves.

Figure 4:
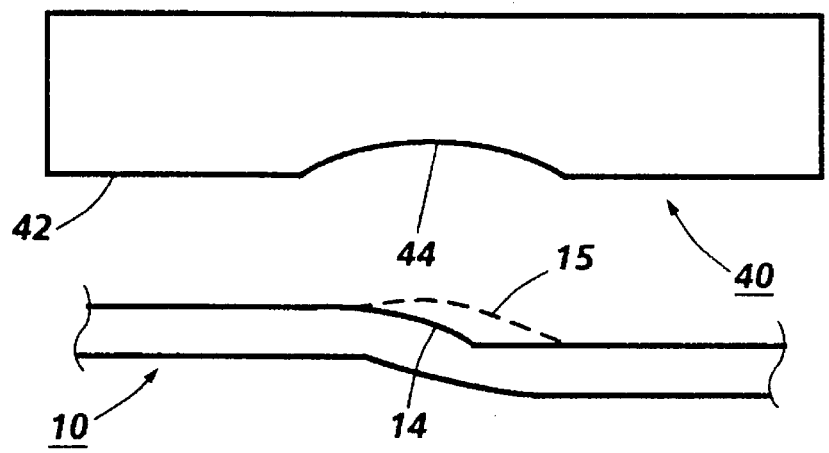
FIG. 4 is a schematic, sectional view in elevation of a blade applicator means for coating belt seams.

Similarly, referring to FIG. 4, a blade applicator 40 may be used where the distance from the blade 40 to the surface of the photoreceptor 10 is smaller or in contact at each end 42 of the blade applicator 40 and is larger at 44 which corresponds to the center of the seam 14. The larger distance at 44 forms a seam coating 15 that is thinner at the edges.

Figure 5:
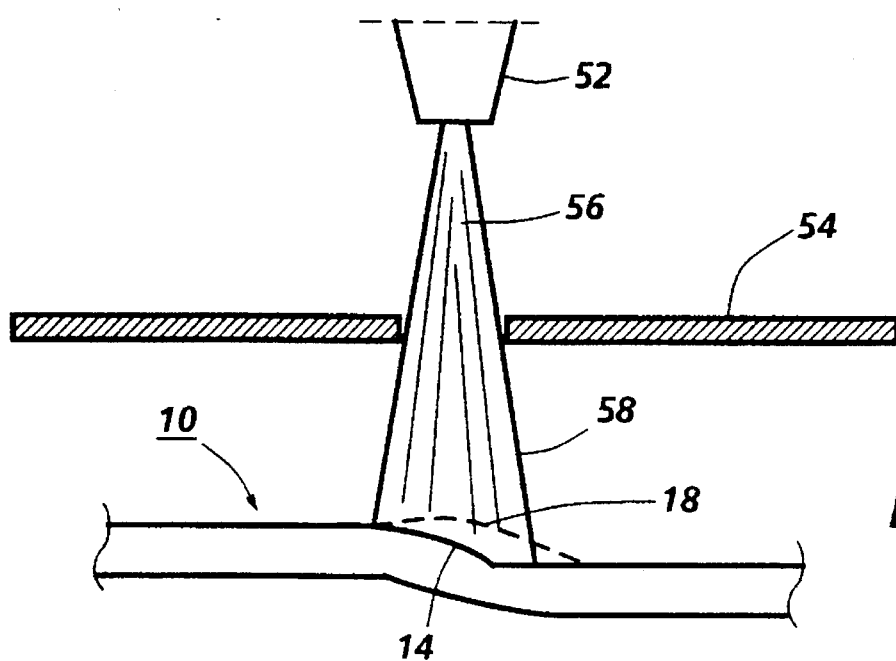
FIG. 5 is a schematic, sectional view in elevation of a spray coating applicator means for coating belt seams.

The seam may also be traversed by a spray applicator 52, as shown in FIG. 5, where the mask 54 contacts and restricts the coating spray 56 and allows the edges of the spray pattern 58 to form a thinner seam coating 18 at the edges due to feathering and a denser and thicker coating in the center of the seam 14 of the seamed photoreceptor 10.

Thus, the process of this invention involves a coating technique that fills in the irregularities and defects of a flexible belt seam thereby providing a uniformly smooth seam region which is durable, does not trap debris such as paper fibers or developer materials, or cause damage to contacting objects such as a cleaning blade.

Any suitable thin, flexible web comprising a weldable thermoplastic metallic or thermoplastic polymer layer may be used in the process of this invention. The web may comprise a single layer or a plurality of layers in which at least one of the layers comprises thermoplastic material. Any suitable thermoplastic material which will melt at the temperatures generated at the contiguous overlapping web surfaces of the seam may be utilized. Typical flexible metallic layers include nickel, and the like. Typical thermoplastic, polymeric materials include polyethylenes, polypropylenes, polycarbonates, polyvinylacetate, terephthalic acid resins, polyvinylchloride, styrene-butadiene copolymers and the like.

A preferred seamed belt is a flexible electrostatographic belt imaging member. Flexible belt imaging members are well known in the art. Typical electrostatographic flexible belt imaging members include, for example, photoreceptors for electrophotographic imaging systems and electroceptors or ionographic members for electrographic imaging systems.

Electrostatographic flexible belt imaging members may be prepared by any suitable technique. Typically, a flexible substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto the blocking layer and a charge transport layer is formed on the charge generation layer. For ionographic imaging members, an electrically insulating dielectric layer is applied to the electrically conductive surface.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are flexible as thin webs. The electrically insulating or conductive substrate should be flexible and in the form of an endless flexible belt.

The thickness of the substrate layer depends on numerous factors, including beam strength and economical considerations, and thus this layer for a flexible belt may be of substantial thickness, for example, about 125 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. The conductive layer need not be limited to metals. Other examples of conductive layers include combinations of materials such as conductive indium tin oxide conductive carbon black dispersed in a plastic binder.

After formation of an electrically conductive surface, a hole blocking layer may be applied thereto. Any suitable blocking layer capable of forming an electronic barrier to charges such as holes between the adjacent photoconductive layer and the underlying conductive layer may be utilized. The blocking layer may be nitrogen containing siloxanes or nitrogen containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylaminoethylamino)titanate, isopropyl trianthranil titanate, isopropyl tri(N,N-dimethyl-ethylamino)titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,291,110, 4,338,387, 4,286,033 and U.S. Pat. No. 4,291,110. The disclosures of U.S. Pat. Nos. 4,338,387, 4,286,033 and U.S. Pat. No. 4,291,110 are incorporated herein in their entirety. The blocking layer should be continuous and have a thickness of less than about 0.2 micrometer because greater thicknesses may lead to undesirably high residual voltage.

An optional adhesive layer may applied to the hole blocking layer. Any suitable adhesive layer well known in the art may be utilized. Typical adhesive layer materials include, for example, polyesters, polyurethanes, and the like. Satisfactory results may be achieved with adhesive layer thickness between about 0.05 micrometer and about 0.3 micrometer.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigments such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diaminotriazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in resinous binder compositions in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in a multilayered photoconductor comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture preferably comprises a charge transporting aromatic amine compound capable of supporting the injection of photogenerated holes of a charge generating layer and transporting the holes through the charge transport layer such as triphenylmethane, bis(4-diethylamine-2-methylphenyl)phenylmethane; 4'-4"-bis(diethylamino)-2',2"-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder.

Any suitable inactive resin binder soluble in methylene chloride or other suitable solvent may be employed in the process of this invention. Typical inactive resin binders soluble in methylene chloride include polycarbonate resin, polyester, polyarylate, polyacrylate, polyether, polysulfone, and the like. Generally, the thickness of the transport layer is between about 10 to about 50 micrometers, but thicknesses outside this range can also be used. The transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. Nos. 4,265,990, 4,233,384, 4,306,008, 4,299,897 and U.S. Pat. No. 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Other layers may be utilized such as conventional electrically conductive ground strip along one edge of the belt in contact with the conductive layer, blocking layer, adhesive layer or charge generating layer to facilitate connection of the electrically conductive layer of the photoreceptor to ground or to an electrical bias. Ground strips are well known and usually comprise conductive particles dispersed in a film forming binder.

Optionally, an overcoat layer may also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semi-conductive. They are also continuous and generally have a thickness of less than about 10 micrometers. A typical overcoating is described in U.S. Pat. No. 4,515,882, the entire disclosure of which is incorporated herein by reference. The thickness of anti-curl backing layers should be sufficient to substantially balance the total forces of the layer or layers on the opposite side of the supporting substrate layer and typically is between about 70 and about 160 micrometers For electrographic imaging members, a flexible dielectric layer overlying the conductive layer may be substituted for the photoconductive layers. Any suitable, conventional, flexible, electrically insulating dielectric polymer may be used in the dielectric layer of the electrographic imaging member. If desired, the flexible belts of this invention may be used for other purposes where cycling durability is important.

Generally, electrostatographic imaging members are fabricated from webs by cutting the webs into rectangular sheets, overlapping a small segment of opposite edges of each sheet to form a loop and securing the overlapping edges of the sheet together to form a narrow seam. The overlapped edges of the sheet may be secured to each other by any suitable technique such as ultrasonic welding and the like. Any suitable seam overlap may be utilized. A preferred range of overlap is between about 0.7 millimeter and about 4 millimeters. The preparation of welded belts is well known and disclosed, for example, in U.S. Pat. No. 4,532,166 and U.S. Pat. No. 4,838,964. The disclosures of these patents are incorporated herein in their entirety.

Any suitable liquid coating comprising a solidifiable film forming polymer composition containing a fugitive liquid carrier may be utilized to coat the belt seam. The expression "fugitive liquid carrier" as employed herein is defined as a removable solvent, emulsifying liquid or dispersing liquid that evaporates and leaves the coating composition after the coating has been deposited. Solvents, emulsifying liquids or dispersing liquids contacting the photoreceptor surface should not dissolve or otherwise cause permanent distortion of at least the components in the outer surface of the belt. Solubility in such liquids can cause undesirable deformation, blistering and the like of the photoreceptor surfaces. Also, the coating should be free of any other components which adversely cause permanent distortion of the underlying belt. However, temporary swelling of the outer surface by the liquid carrier is acceptable, particularly where such swelling promotes an interpenetrating network to be formed between the film forming polymer coating molecules and the polymer molecules in the outer surface of the photoreceptor. This formation of an interpenetrating network enhances adhesion of the seam coating to the seam.

Generally, the liquid coating compositions applied to the belt seam comprise film forming polymers dissolved in a solvent as a solution, or suspended as particles or globules in carrier liquid as an emulsion or dispersion. The word "solution" as employed herein is defined as a uniformly dispersed mixture at least at the molecular or ionic level of one or more substances in one or more liquid solvents. The word "emulsion" as used herein is defined as a stable immiscible mixture of one or more film forming liquefied polymers held in suspension in a liquid carrier continuous phase by an emulsifier. The word "dispersion" as employed herein is defined as an immiscible mixture of one or more finely divided film forming polymer liquids or particles temporarily held in suspension in a liquid carrier continuous phase. The film forming polymer may be in the form of a polymer, a pre-polymer, a partially cross-linked polymer, a crosslinkable material admixed with a high temperature catalyst which is triggered by activating radiation, a linear polymer or copolymer and the like. The preferred coating mixture is an emulsion because minimum shrinkage of the deposited coating occurs during polymer coating solidification. Removal of the fugitive liquid carrier is preferably accomplished with no or minimum application of heat, particularly where the belt contains heat sensitive components. The use of little or no heat to drive off the carrier liquid minimizes shrinkage of the coating during solidification and therefore minimizes distortion of the underlying seam by such shrinkage. Little or no heat is required when the carrier liquid has a high vapor pressure or when vacuum drying is employed. Excessive application of heat can adversely affect the properties of heat sensitive photoreceptors.

The film forming coating composition should be capable of being applied in a fluid state and the polymer thereafter solidified into a continuous coating after application and during or after removal of the liquid carrier. The coating material should also be flexible, continuous, film forming, resilient, stable, nonreactive when cured, non-tacky, resistant to cracking and adhere well to the substrate. The film forming polymers should wet the surface of the belt during application. More specifically, the surface energy of the belt and seam surface to be coated should exceed the surface energy of the film forming polymer by at least about 30 percent based on the surface energy of the polymer coating mixture. The angle of incidence of the coating material on the surface of the substrate to be coated should be acute.

Any suitable film forming polymer may be used in the liquid coating applied to the belt seam. The film forming polymer is preferably soluble in a solvent which will not affect the properties of the charge transport layer if the overcoat layer is applied to the charge transport layer. If the outermost layer of the belt is applied with a specific solvent, that solvent should be avoided as a solvent for the seam coating composition. In a multilayered photoreceptor, the charge transport layer is typically applied with methylene chloride. In this situation, it is preferred that the film forming polymer for seam coating solutions be soluble in a solvent such as alcohol which will not attack the charge transport layer. Typical film forming binders include polyamides, acrylics, polyurethanes, polycarbonate resin, polyvinyl-carbazole, polyester, polyarylate, polyacrylate, polyether, polysulfone, silicones and the like. Molecular weights can vary from about 20,000 to about 1,500,000. Other solvents that may dissolve these binders include tetrahydrofuran, toluene, trichloroethylene, 1,1,2-trichloroethane, trichloroethane, and the like. One preferred film forming binder is a polyamide (Elvamide 8061, available from E. I. du Pont de Nemours & Co.). It is believed that dupont Elvamide 8061 is principally a nylon 6,6 material, containing carboxyl, amide and amine groups. A significant advantage for the present application is its alcohol solubility. It is softer and more flexible than conventional nylons, but is tough and withstands impact and resists abrasion. Nylons are generally known as being hydrophilic, and as such would be generally unsuitable for photoconductor applications. However, hydrogen bonding sites along the nylon backbone can be occupied by active hydroxy substituent groups such as a charge transport compound additive (described below), or other suitable active hydroxylated compounds which renders the seam coating hydrophobic. This is evidenced by the charge transport compound being unable to be leached from the dried seam coating by solvents such as ISOPAR, a highly purified branched chain alkane solvent available from Exxon Corp. The film forming polymer particles in an emulsion are normally in liquid form and typically have an average particle size between about 0.3 micrometer and about 3 micrometers. Suitable emulsion polymers include polymers of acrylics such as DUR-O-CRYL 720 and DUR-O-CRYL 820, available from National Starch, and polyurethanes such as NEO-REZ R-966, available from Polyvinyl Chemicals. The emulsions may also contain a minor amount of conventional surface active agents to stabilize the emulsion. The film forming polymer particles in a dispersion are usually solids and typically have particle size between about 0.02 micrometer and about 200 micrometers.

A preferred flexible liquid seam coating comprises a film forming polymer binder/charge transport molecule composite, which when coated with suitable solvents and dried develops a durable protective coating on the photoreceptor seam. The charge transport molecule is preferably "locked" into the seam coating matrix through bonding, such as hydrogen bonding. Thus, the charge transport molecule is not drawn out of the seam coating during machine functions, such as occurs with typical charge transport molecules used in a charge transport layer of an electrophotographic imaging member. The charge transport molecule preferably contains a group or groups which may react with the film forming binder to lock the charge transport molecule in the binder. For example, the charge transport molecule may contain hydroxy groups which react with the film forming polymer through hydrogen bonding. The overcoating layer is preferably formed from a mixture comprising at least one aromatic amine compound (triaryl amine) of the formula:

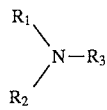

wherein $R_1$ and $R_2$ are each an aromatic group elected from the group consisting of a substituted or unsubstituted phenyl group, naphthyl group, and polyphenyl group and $R_3$ is selected from the group consisting of a substituted or unsubstituted aryl group, an alkyl group having from 1 to 18 carbon atoms and a cycloaliphatic group having from 3 to 18 carbon atoms. The substituents should be free from electron-withdrawing groups such as $NO_2$ groups, CN groups, and the like. The preferred flexible liquid seam coating is formed from a mixture comprising at least one aromatic amine compound (triaryl amine) of the formula:

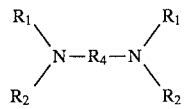

wherein $R_1$ and $R_2$ are defined above, and $R_4$ is selected from the group consisting of a substituted or unsubstituted biphenyl group, a diphenyl ether group, an alkyl group having from 1 to 18 carbon atoms, and a cycloaliphatic group having from 3 to 12 carbon atoms. Examples of charge-transporting aromatic amines represented by the structural formulae above include triphenylmethane, bis(4-diethylamine-2-methylphenyl)phenylmethane, 4-4'--bis(diethylamine)-2,2'-dimethyltriphenylmethane; N,N'-bis (alkylphenyl)-(1,1'-biphenyl)-4,4'-diamine wherein the alkyl is, for example, methyl, ethyl, propyl, n-butyl, etc.; N,N'-diphenyl-N,N'-bis (3-rhethylphenyl)-(1,1'biphenyl)-4,4 I-diamine⁻ and the like, dispersed in an inactive resin binder. Triaryl amines are well known as charge transporting compounds. A more detailed discussion of the triaryl amines will be made hereinbelow in reference to a charge transport layer of an electrophotographic imaging member. However, to facilitate understanding of the present invention, reference will be made to a specific charge transport molecule used in the overcoat layer of the present invention. The charge transport molecules of the present invention are analogs of triaryl amines. One specific analog of a triaryl amine has the formula:

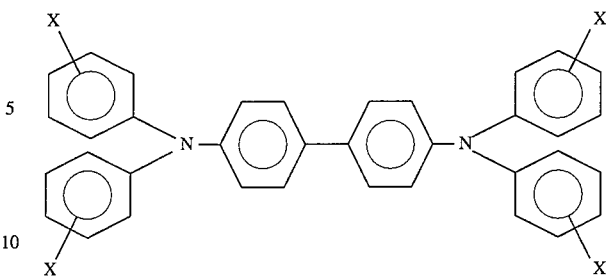

wherein X represents a hydroxy group or hydrogen. Preferred analogs of the above compounds include the dihydroxy analog and the tetrahydroxy analog. These film forming polymer binder/charge transport molecule composites are described further in copending U.S. application Ser. No. 07/560,876, filed Jul. 31, 1990, entitled OVERCOAT FOR IMAGING MEMBERS, the disclosure thereof incorporated herein in its entirety.

Any suitable carrier liquid may be utilized in the liquid coating mixture applied to the seam. The liquid should not dissolve any of the components in at least the outer surface of the belt. However, a slight temporary swelling of the outer surface of the belt by the liquid is acceptable so long as the belt does not exhibit distortion after the carrier liquid is removed during drying. Such swelling allows an interpenetrating network to be formed between the applied polymer seam coating and the polymer in the outer surface of the underlying photoreceptor layer. The slight amount of swelling of the outer surface of the belt should not adversely affect the imaging properties of photoreceptor layers. Typical carrier liquids include water, alcohols such as methanol, ethanol, isopropanol, butanol, glycols mixtures thereof and the like. In general, polychlorinated hydrocarbons do not dissolve polycarbonate, a typical film forming binder component in the exposed charge transport layer of multilayered photoreceptors. If desired, mixtures of liquids in the liquid carrier may be utilized to control the drying rate of the deposited coating. Generally the amount of carrier liquid utilized in the liquid coating mixture depends upon the the specific coating technique utilized. Satisfactory results may be achieved when the applied coating composition contains between about 95 percent by weight of and about 50 percent by weight of carrier liquid, based on the total weight of the coating composition. When the applied coating composition contains less than about 95 percent by weight of carrier liquid, surface wetting problems can occur causing poor films to form. When the applied coating composition contains more than about 50 percent by weight of carrier liquid, the coating may not always be smooth and uniform. The presence of suitable carrier liquid can also promote improved wetting of the belt surface by the coating mixture during the coating operation. Examples of combinations of specific polymers with specific liquid carriers include, for example, certain polyamides (e.g. Elvamides, available from E. I. dupont de Nemourts & Co.) and alcohol; emulsions of acrylic polymers and water; emulsions of polyurethanes and water, and the like.

If desired, minor amounts of any suitable additive such as plasticizers, colorants, wetting agents, fillers, and the like, may be added to the seam coating mixture. Generally, the amount of filler is less than about 10 percent, based on the total weight of the final coating, but can be as much as 40 to 50 percent in special cases such as with silicone hard coat material. Generally, the size of the additive particle should be less than the thickness of the seam coating after hardening. The seam coating mixture may contain other additives, such as adhesion promoters. For example, adhesion promoters such as polymethyl methacrylate (e.g. Elvacite 2008, available from E. I. du Pont de Nemours & Co.) may be added. Other additives include Elvacite 20441 Elvacite 2046 and Elvacite 20281 all available from E. I. du Pont de Nemours & Co.. When these adhesion promoting additives are employed, they may be present in the seam coating layer in an amount ranging between about 0.1 percent and about 15 percent by weight, based on the total weight of the final coating. If desired, the seam coating may contain an electrically conductive component. Typical electrically conductive components include graphite, quaternary salts such as used in silicone hard coat compositions, metal particles such as gold, aluminum, silver, titanium, nickel, and the like. For electrically conductive coatings, sufficient conductive additive is preferably added to ensure particle to particle contact in the dried coating. Since a welded seam normally does not normally discharge completely during image cycling, a seam coating that is electrically conductive minimizes the buildup of dry toner or liquid developer material deposits on the seam region which wastes toner and which can be a source of contamination for other machine components and subsystems such as optical lenses and corona wires. Alternatively, the seam coating composition may be electrically insulating. The relative amount of the other additives is usually less than about 5 percent based on the total weight of the final coating. Generally, the particle size of additives should be less than about the thickness of the dried coating.

The coating composition can be applied to the seam by any suitable technique. Typical coating techniques include blade coating, roll coating, gravure coating, extrusion coating, wire wound coating rod coating and the like. A preferred coating technique involves application of the coating in a direction parallel to the length of the seam. The coating applicator surface may be of any suitable shape such as the flat or curved cross-sectional shapes and like as illustrated, for example, in FIGS. 2, 3, 4, 5 and 6.

The viscosity of the coating composition in its liquefied state can vary widely, depending on the particular method of coating chosen. Typically, satisfactory coatings can be readily formed on the seams from coating compositions having a viscosity in the range from about 25 to about 1000 centipoises, and more preferably in the range from about 75 to about 200 centipoises. Preferably, the coating material should flow moderately, but not so much that it spreads over too large a surface before drying.

The seam coating process of the present invention may be accomplished, for example, after the seam forming step is completed in the fabrication of belted photoreceptors. Preferably, the seam coating process is performed immediately following the seam forming process while the newly formed belted photoreceptor is still engaged in automated lap joint forming and handling equipment to minimize damage in intermediate handling steps. Because it is difficult to position the coating applicator precisely on the extreme edge of the welded seam every time for each coating operation, it is preferred that the coating applicator be positioned adjacent to the edge of the welded seam and then be moved slowly onto and directly over the welded seam. If desired, the coating applicator may be held stationary and the welded seam may be moved relative to the coating applicator or both coating applicator and welded seam may be moved relative to each other to effect traversal of the coating applicator along the welded seam. Drying may be effected by mere exposure to ambient conditions. Alternatively, by a stationary radiation heating source or one that traverses the coated seam may be utilized. A typical radiation heating source such as an IR lamp can be moved over the coated seam at a suitable traverse rate for drying.

For embodiments where the coating applicator moves during coating to provide relative motion between a moving or stationary photoreceptor, such movement may be accomplished by any suitable means such as a lead screw and ball arrangement, belt and pulley drive, or the like.

The thickness of the final dry, solidified seam coating should be sufficient to cover, or smooth, the largest surface projection created during welding of the belt seam, although weld splash separation can be prevented with coatings as thin as 2 micrometers. Typically, a seam coating having a thicknesses between about 50 micrometers and 60 micrometers above the average surface of the seam at the seam centerline prevents both weld splash separation from the web when the belt is cycled around small diameter rollers, and covers typical surface projections arising from the weld. The seam centerline is defined as the midpoint of the overlap interface of the web ends that were welded together. The coating should be gently sloping and continuous as it traverses the seam. Coating materials such as specified herein are abrasion resistant, and exhibit minimum wear when cycled against a normal xerographic cleaning blade, for example. A minimum coverage of weld projections is therefore all that is required. Other material which does not offer high abrasion resistance would be coated to a greater thickness of up to about 200 micrometers, so that the weld projections would not be exposed by wear before the belt was normally replaced. Generally, when the seam coating is too thin, good adhesion and durability will not be obtained, or the seam projections will not be sufficiently smoothed or fully covered. When the seam coating is too thick a bump could be formed which could adversely affect cleaning. Thicker seam coatings up to 200 micrometers or greater may be utilized depending on particular seam weld dimensions, and as long as the seam coating can be hardened and flexibility of the belt is not adversely affected. For example, when infrared radiation curing is utilized, the seam thickness should not be so thick as to prevent the applied radiant energy driving off substantially all of the liquid carrier during the drying cycle. The distance of the cured seam coating edge from the seam centerline may vary but should extend far enough from the seam centerline to cover the surface irregularities created during welding. Seam coating edge locations extending in a direction perpendicular to the seam centerline beyond the seam irregularities tend to reduce the total area of the outwardly facing belt surface available for imaging. However, where the weld irregularities are relatively high and narrow, wider seam coatings provide a more gradual ramp or slope for cleaning devices such as blades to slide over the seam. Generally, satisfactory results may be achieved with cured seam widths in which the distance of the cured seam coating edge from the seam centerline is between about 3 mm and about 10 mm. A feathered edge on each edge of the seam is prefered for optimum interaction with cleaning blades as the cleaning blade rides over the seam coating, although sufficiently thinned, but smooth and rounded contacts or edges are acceptable.

The drying of the seam coating compositions of this invention may be accomplished by exposure to any suitable conventional drying technique. Typical drying techniques infrared radiation drying, oven drying, forced air drying, air drying and the like. For seam coatings containing highly volatile liquid carriers, mere exposure to ambient air or forced air cooling, may be utilized to solidify the film forming polymer and remove the liquid carrier. The drying conditions utilized used should be of sufficient intensity to remove substantially all of the liquid carrier in the solidified coating. The use of reduced pressure conditions in the drying process provides for a substantial reduction in the temperatures required for substantially complete drying. The solidifiable film forming seam coating compositions of this invention should be substantially completely convertible to a solid product during the drying step. Preferably, the film forming seam coating compositions of this invention should undergo little or no shrinkage upon drying.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A photoconductive imaging member was prepared by providing a web of titanium coated polyester (Melinex 442 available from ICI Americas Inc.) substrate having a thickness of 3 mils, and applying thereto, using a gravure applicator, a solution containing 50 grams 3-amino-propyltriethoxysilane, 15 grams acetic acid, 684.8 grams of 200 proof denatured alcohol and 200 grams heptane. This layer was then dried for 10 minutes at 135° C. in a forced air oven. The resulting blocking layer has a dry thickness of 0.05 micrometer.

An adhesive interface layer was then prepared by applying a wet coating over the blocking layer, using a gravure applicator, containing 0.5 percent by weight based on the total weight of the solution of polyester adhesive (du Pont 49,000 available form E. I. du Pont de Nemours & co.) in a 70:30 volume ratio mixture of tetrahydrofuran/cyclohexanone. The adhesive interface layer was then dried for 10 minutes at 135° C. in a forced air oven. The resulting adhesive interface layer has a dry thickness of 0.05 micrometer.

The adhesive interface layer was thereafter coated with a photogenerating layer containing 7.5 percent by volume trigonal selenium, 25 percent by volume N,N'-diphenyl-N, N'-bis(3-methylphenyl)-1,1'-biphenyl-4,4'-diamine, and 67.5 percent by volume polyvinylcarbazole. This photogenerating layer was prepared by introducing 80 grams polyvinylcarbazole to 1400 ml of a 1:1 volume ratio of a mixture of tetrahydrofuran and toluene. To this solution are added 80 grams of trigonal selenium and 10,000 grams of ⅛ inch diameter stainless steel shot. This mixture was then placed on a ball mill for 72 to 96 hours. Subsequently, 500 grams of the resulting slurry are added to a solution of 36 grams of polyvinylcarbazole and 20 grams of N,N'-diphenyl-N,N'-bis(3-methylphenyl)-1,1'-biphenyl-4,4'-diamine in 750 ml of 1:1 volume ratio of tetrahydrofuran/toluene. This slurry was then placed on a shaker for 10 minutes. The resulting slurry was thereafter applied to the adhesive interface with an extrusion die to form a layer having a wet thickness of about 0.5 mil. This photogenerating layer was dried at 135° C. for 5 minutes in a forced air oven to form a photogenerating layer having a dry thickness of 2.3 micrometers.

This member was then coated over with a charge transport layer. The charge transport coating solution was prepared by introducing into a carboy container in a weight ratio of 1:1 N,N'-diphenyl-N,N'-bis(3-methylphenyl)-1,1'-biphenyl-4, 4'-diamine, and the binder resin Makrolon 5705, a polycarbonate having a weight average molecular weight from about 50,000 to about 1,000,000, available from Farbenfabricken Bayer AG. The resulting solid mixture was dissolved in methylene chloride to provide a 15 weight percent solution thereof. This solution was then applied onto the photogenerator layer by extrusion coating to form a wet charge transport layer. The resulting photoconductive member was then dried at 135° C. in a forced air oven for 5 minutes to produce a 24 micrometers dry thickness charge transport layer.

EXAMPLE II

The photoconductive imaging member described in Example I was fabricated into belted photoreceptors having a seam. The belts were formed by overlapping about 0.9 mm of the opposite ends of each belt to form a seam, placing the seam on an anvil, and welding the seam with a traversing ultrasonic welding horn.

The photoreceptors were print tested in a series of conventional xerographic copier machines having a photoreceptor speed of about 10.0 inches per second. The machine belt module of the copier machines comprised a 3 roll belt support structure in which one roll had a diameter of 23 mm. A stationary elastomer blade was used to clean the photoreceptor. The elastomer blade cleaner assembly was operated without assists or redundant members. The machines were monitored for cleaning failures. Cleaning failures were flagged and the blades replaced when background streaks of toner appeared on the prints. Replaced cleaning blades were collected and inspected to correlate the physical condition of the blade edge with the point of failure. Simple blade replacement restored copy quality in all cases except those where blade defects were so severe, or of a nature that they scratched the photoreceptor surface, wherein the photoreceptors were also replaced. Analysis of the data collected confirmed that there was no predictable number of cycles to the point of cleaning failure: failure occurred after as few as several thousand prints, and in some cases were never observed after as many as several hundred thousand prints. Physical inspection of the failed cleaning blades revealed that material had been gouged or nicked from the blade edge at the point of cleaning failure.

It is believed that the gouges or nicks in the blade edges which correlated with the observed cleaning failures were caused to occur because of the repetitive passage of the blade edge over the exposed projections and unevenness of the seam. Due to inherent photoreceptor-to-photoreceptor variations occurring in manufacture, the seam characteristics, including the number density, height and sharpness of the exposed projections, are expected to be random, within prescribed limits. Sean projections undoubtedly induce severe stress in the blade contact edge as the blade repetitively passes over the seam. The randomness in the character of the seam projections qualitatively correlates with the observed random cleaning failures in both copy count and location on the photoreceptor. In light of the large number of photoreceptors used in the test and the relatively long extension of the seam, such randomness in seam characteristics would be difficult to quantify and definitively relate to the onset of blade cleaning failure.

EXAMPLE III

A seamed belt identical to the one described in the first paragraph in Example II was placed on a supporting surface with the imaging surface facing upwardly. A liquid coating of an emulsion of polyacrylate polymer (DUR-O-CRYL 720, available from National Starch) in water (40 percent by weight solids based on the total weight of the emulsion) was applied over the length of the seam by blade coating. The wet thickness of the coating over the centerline of the welded seam was about 25 micrometers. The distance of each edge of the wet coating from the centerline of the welded seam was about 10 mm. The coating was air dried for about 60 minutes. The dried coating formed a solid, tough, smooth and flexible coating over the seam that was substantially free of liquid carrier and which did not distort the photoreceptor. All of the protrusions in the welded seam of the sample belt were covered by the dried coating.

EXAMPLE IV

The photoconductive imaging member described in Example I was fabricated into belted photoreceptors having a seam. The belts were formed as described in the first paragraph in Example II by overlapping about 0.9 mm of the opposite ends of each belt to form a seam, placing the seam on an anvil, and welding the seam with a traversing ultrasonic welding horn.

The photoreceptors were print tested in a convential xerographic copier machine having a photoreceptor speed of about 15.75 inches per second. The machine belt module was comprised of a 3 roll belt support structure in which one roll had a diameter of 19 mm. A two roll electrostatic circulating fur brush cleaner was used to clean the photoreceptor. The machine was continuously monitored for the appearance, accumulation and/or collection of toner and/or other xerographic developer debris scattered inside the machine which had escaped the normal cleaning and intended materials throughput channels. Invariably, accumulation of such adventitious developer debris was found in locations such as on the face of photoreceptor charging and neutralization devices after as few as 50,000 machine prints, beginning with a fresh photoreceptor. Generally, debris accumulation was not continuous across the full length of the machine devices, but occurred in distinct bands. Each band was of uniform width, but different bands were observed to have different widths. When debris accumulation at the indicated locations continued uninterrupted, a point was reached where photoreceptor charging and/or neutralization were shifted outside normal operating ranges. When the operating latitudes for the charging and neutralization devices were exceeded because of the accumulation of toner and/or developer debris, print quality became unacceptable.

The scattering of loose debris in the machine was tracked in a series of experiments, and was found to be caused by photoreceptor weld splash separation from the underlying web material. Developer debris appeared to become trapped or wedged between the loose weld splash and underlying web surface, and subsequently released or scattered when the weld splash opened, such as when passing over small diameter rollers, for example. Debris banding on machine devices was observed to align with photoreceptor seam areas where the weld splash appeared loose or separated.

Debris banding on machine devices such as observed in normal machine copy was induced to occur in specific locations with fresh photoreceptors by prying the weld splash loose from the underlying web material. Debris banding on the faces of the charging and neutralization devices, for example, were observed to align with the position of the specifically induced weld splash separation.

EXAMPLE V

A flexible seamed photoreceptor belt identical to the ones described in Example IV was placed on a supporting surface with the imaging surface facing upwardly. A liquid coating of an emulsion of polyacrylate polymer(DUR-O-CRYL 720, available from National Starch) in water (40 percent by weight solids based on the total weight of the emulsion) was applied over the length of the seam using a cotton-tipped applicator. The wet thickness of the coating over the centerline of the welded seam was between about 20 to 50 micrometers. The distance of the edge of the wet coating from the centerline of the welded seam was about 5 mm. The coating was oven dried at 100° F. for 15 minutes. The dried coating formed a solid, tough, smooth and flexible coating over the seam that was substantially free of liquid carrier and which did not distort the photoreceptor. All of the protrusions in the welded seam of the sample belt were covered by the dried coating.

A machine print test duplicating those described in Example IV was carried out. The machine, including the faces of the charging and neutralization devices, remained free of toner and/or developer debris through the intrinsic life of the photoreceptor, about 500,000 prints. Examination of the photoreceptor following the test confirmed that the coating remained uniformly bonded to the photoreceptor over the full length and along both edges of the seam, thus prohibiting developer debris from coming into contact with the weld splash and/or photoreceptor seam.

EXAMPLE VI

A flexible photoreceptor identical to the one described in the first paragraph in Example II can be placed on the flat surface of a table with the imaging surface facing upwardly. A metal mask stencil consisting of about 0.076 mm (0.003 inch) thick stainless steel can be placed between the photoreceptor seam surface and a spray coating nozzle in an arrangement similar to that illustrated in FIG. 5. The distance between the seam and the mask, and between the mask and the tip of the spray gun nozzle can be optimized to limit the lateral extent of liquid deposition. An emulsion of an acrylic polymer (DURO-CRYL 720, available from National Starch) in water (15 percent by weight solids based on the total weight of the emulsion) can be applied by the spray gun over the length of the seam. The wet thickness of the coating over the centerline of the welded seam can be controlled to between about 50 to 60 micrometers. The distance of each edge of the wet coating from the centerline of the welded seam can be limited to betwen about 7.0 to 10.0 mm. The coating can be air dried or dried by placing it beneath a heating source. The photoreceptor can be shielded with an appropriate mask if dried with a heating source to prevent stray heat energy from inducing damage to the imaging portion of the photoreceptor. The dried coating is expected to form a solid, tough, smooth and flexible coating over the seam that should be substantially free of liquid carrier and which should not distort the photoreceptor. All of the protrusions in the welded seam should be covered by the dried coating.

EXAMPLE VII

A seamed belt identical to the one described in the first paragraph in Example II was placed on a supporting surface with the imaging surface facing upwardly. A liquid coating of an emulsion of polyurethane (NEO-REZ R-966, available from Polyvinyl Chemicals) in water (30 percent by weight solids based on the total weight of the emulsion) was applied over the length of the seam by blade coating. The wet thickness of the coating over the centerline of the welded seam was about 25 micrometers. The distance of each edge of the wet coating from the centerline of the welded seam was about 10 mm. The coating was air dried for about 30 minutes, then oven dried at 80° C. for 30 minutes. The dried coating formed a solid, tough, smooth and flexible coating over the seam that was substantially free of liquid carrier and which did not distort the photoreceptor. All of the protrusions in the welded seam of the sample belt were covered by the dried coating.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for coating flexible belt having welded lap joint seams comprising providing a rectangular flexible web comprising a thermoplastic substrate and at least one imaging layer having an outer imaging surface, overlapping opposite ends of said web to form an overlapped seam having an overlap of between about 0.7 millimeter and about 4 millimeters, ultrasonically welding the overlapped ends together to form a flexible belt having a welded lap joint seam, forming on said welded lap joint seam a smooth liquid coating strip having a thickness between about 2 micrometers and about 200 micrometers above the average surface of said welded lap joint seam at the centerline of said welded lap joint seam, said liquid coating comprising an emulsion of a film forming polymer in a fugitive liquid carrier in which said belt is substantially insoluble, said outer imaging surface of said imaging layer having a surface energy exceeding the surface energy of said film forming polymer by at least about 30 percent based on the surface energy of said film forming polymer, and removing said fugitive liquid carrier to form a smooth solid coating strip having feathered edges on said welded lap joint seam, the distance of each edge of said solid coating strip from the centerline of said welded lap joint seam being between about 3 mm and about 10 mm.

2. A process comprising providing a rectangular flexible web comprising providing a rectangular flexible web comprising a thermoplastic substrate and at least one imaging layer having an outer imaging surface, overlapping opposite ends of said web to form an overlapped seam having an overlap of between about 0.7 millimeter and about 4 millimeters, ultrasonically welding the overlapped ends together to form a flexible belt having a welded lap joint seam, forming on said welded lap joint seam a smooth liquid coating strip having a thickness between about 2 micrometers and about 200 micrometers above the average surface of said welded lap joint seam at the centerline of said welded lap joint seam, said liquid coating comprising an emulsion of film forming particles suspended in a fugitive liquid carrier in which said belt is substantially insoluble, said outer imaging surface of said imaging layer having a surface energy exceeding the surface energy of said film forming polymer by at least about 30 percent based on the surface energy of said film forming polymer, and removing said fugitive liquid carrier to form a smooth solid coating strip having feathered edges on said welded lap joint seam, the distance of each edge of said solid coating strip from the centerline of said welded lap joint seam being between about 3 mm and about 10 mm, forming an electrostatic latent image on said imaging surface, developing said latent image with toner particles to form a toner image in conformance with said latent image, transferring said toner image to a receiving member, cleaning said imaging surface with a cleaning blade, and repeating said electrostatic latent image forming, developing, transferring and cleaning steps.

3. A process for coating according to claim 2 wherein said fugitive liquid carrier comprises water.

4. A process for coating flexible belt having welded lap joint seams comprising providing a rectangular flexible web comprising a thermoplastic substrate layer, an electrically conductive layer and an electrically conductive layer and a dielectric imaging layer having an outer imaging surface, overlapping opposite ends of said web to form an overlapped seam having an overlap of between about 0.7 millimeter and about 4 millimeters, ultrasonically welding the overlapped ends together to form a flexible belt having a welded lap joint seam, forming on said welded lap joint seam a smooth liquid coating strip having a thickness between about 2 micrometers and about 200 micrometers above the average surface of said welded lap joint seam at the centerline of said welded lap joint seam, said liquid coating comprising a film forming polymer and a fugitive liquid carrier in which said belt is substantially insoluble, said outer imaging surface of said imaging layer having a surface energy exceeding the surface energy of said film forming polymer by at least about 30 percent based on the surface energy of said film forming polymer, and removing said fugitive liquid carrier to form a smooth solid coating strip having feathered edges on said welded lap joint seam, the distance of each edge of said solid coating strip from the centerline of said welded lap joint seam being between about 3 mm and about 10 mm.

* * * * *